July 24, 1956 E. HALPERT 2,755,936
FILTERS
Filed Dec. 23, 1953 2 Sheets-Sheet 1

EMANUEL HALPERT,
INVENTOR,
BY
ATTORNEY.

July 24, 1956 — E. HALPERT — 2,755,936
FILTERS
Filed Dec. 23, 1953 — 2 Sheets-Sheet 2

INVENTOR,
EMANUEL HALPERT
ATTORNEY

United States Patent Office 2,755,936
Patented July 24, 1956

2,755,936
FILTERS

Emanuel Halpert, New York, N. Y.

Application December 23, 1953, Serial No. 399,873

11 Claims. (Cl. 210—150)

The present invention relates to pressure filters and filters generally.

An object of this invention is to provide a filter apparatus of novel and improved construction, affording continuous operation except for slight intervals required for valve manipulation and which for the most part is self-cleaning during its operation.

Another object is to provide a novel and improved filter apparatus of the character mentioned, in which the sediment filtered out, is automatically collected for easy removal without interruption of the filtering operation and such collected sediment is in a practically dry state.

A further object of this invention is to provide a novel and improved filtering system of the kind described, which is of simple construction, reasonably cheap to manufacture, easy to use and efficient in carrying out the purposes for which it is designed.

Other objects and advantages will become apparent as this disclosure proceeds.

In the accompanying drawings showing a preferred embodiment of this invention, similar characters of reference indicate corresponding parts in all the views.

Figure 2:
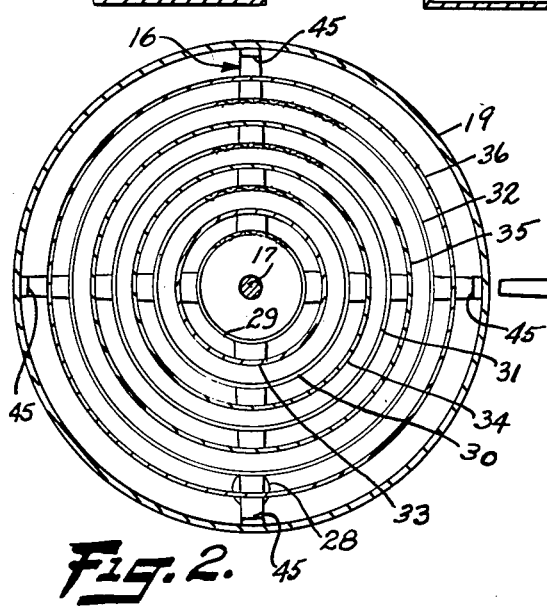
Fig. 2 is a section taken at lines 2—2 in Fig. 1.
Figures 3, 4:
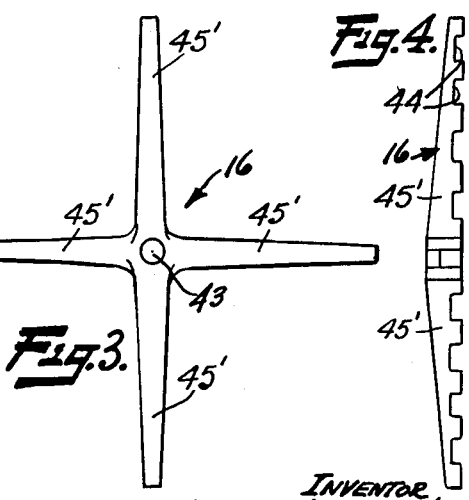
Fig. 3 shows one of a pair of supporting members included in the assembly.
Fig. 4 is a side view of Fig. 3.

The Figs. 2-4 are drawn to a reduced scale.

Figure 1:
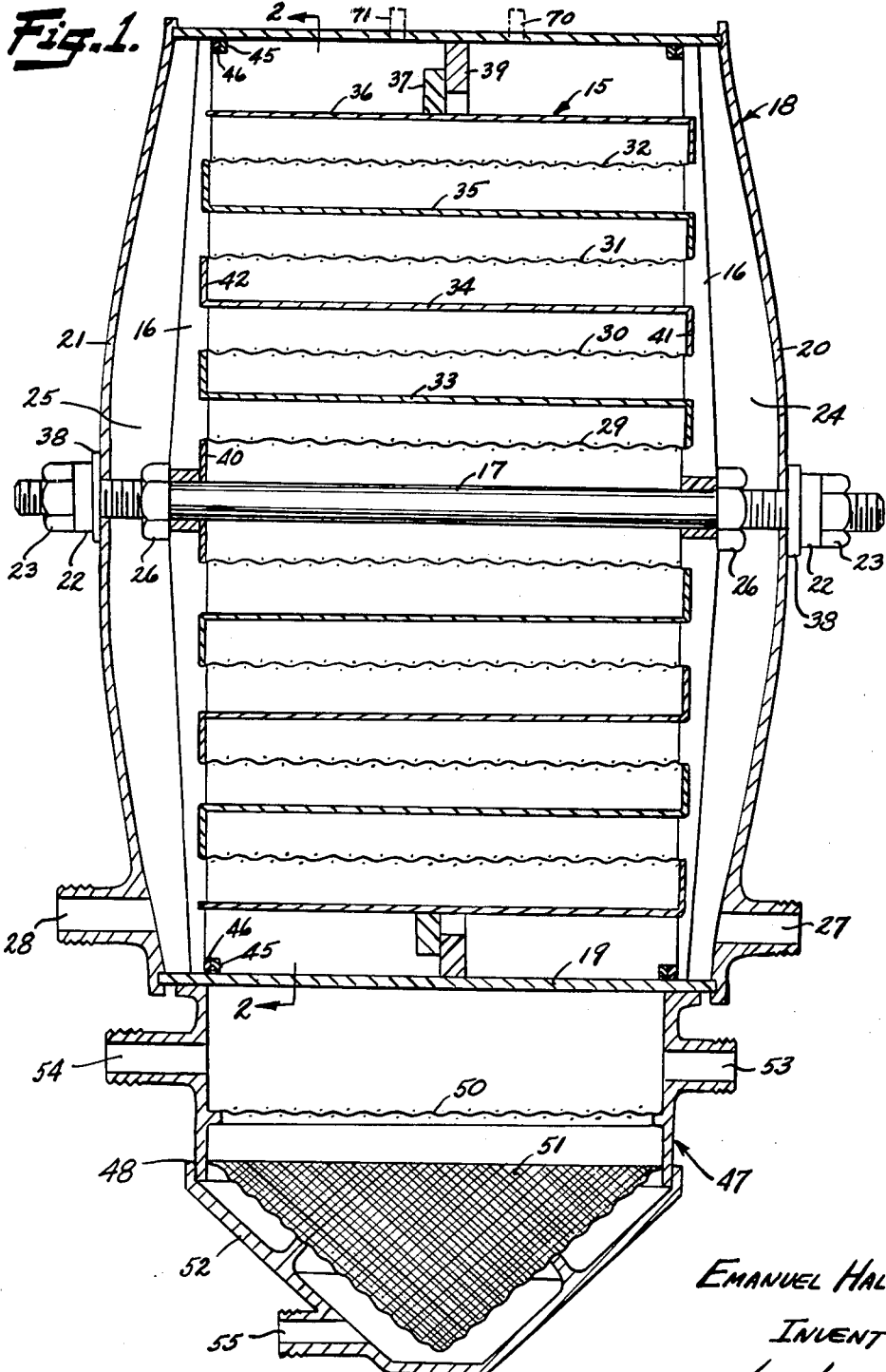
Fig. 1 is a central longitudinal sectional view of a filter apparatus embodying the teachings of this invention.
Figure 5:
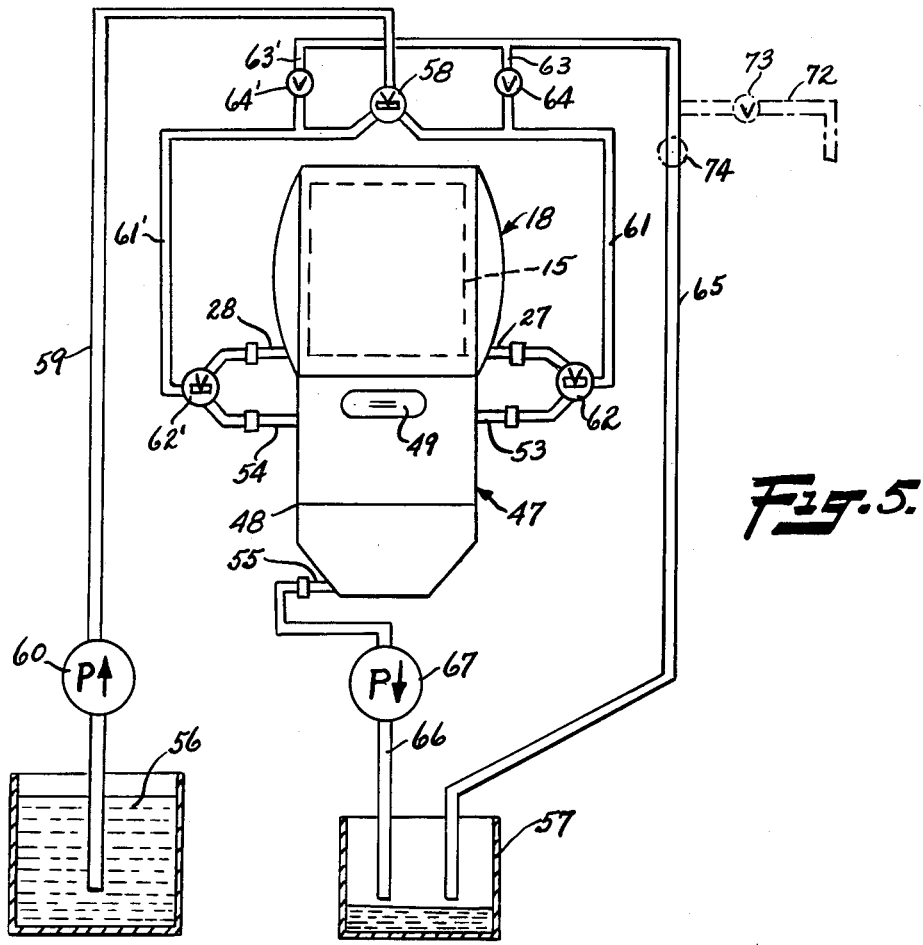

Fig. 5 is a diagrammatic view showing the apparatus of Fig. 1 and its associated piping and control system in accordance with this invention.

Essentially, the filter taught herein consists of a plurality of spaced, concentric, tubular members suspended within a casing. The outer tubular member and all alternate ones are imperforate, while the others are of filter material. There is a ring partition extending from the periphery of the outer tubular member to the inside surface of the casing. One end of each tubular filter member is connected rim-wise to one rim end of the imperforate tubular member which is within it immediately next to it and the other rim end of each tubular member is connected rim-wise to the one rim end of the imperforate tubular member immediately outside it. The ends of all said tubular members are spaced from the casing. The junctures of the tubular members are such that flow into the tubular members at one end of their assembly is into the filter members while flow into the tubular members through the other end of their assembly is into the imperforate members.

The casing has a port to one side of the partition and another port to the other side of the partition. Valve means are provided so that either port is intake while the other is the discharge port. When the valve means are set for the flow to be into the filter members, sediment will collect against the inner surfaces of the filter members. When the valve means are set for the flow to be into the imperforate members, sediment will collect on the outside surface of the filter members while that sediment which had collected on the inside, will be washed away with the flow. An auxiliary filter means is provided to receive the flow carrying the washed away sediment mentioned. There is a valve means to connect either of said ports selectively so that discharge therefrom enter such auxiliary filter. All valve means are manipulated by manual operation. Discharge into a receiving receptacle may be either through the auxiliary filter or from the casing directly, depending upon the setting of the valves. A force pump may be provided in the supply line to the casing and a suction pump may be provided in the discharge line from the auxiliary filter.

In the drawings, the numeral 15 designates generally a filter unit supported on spider members 16 which are carried on a tie rod 17 within an outer casing 18. This casing may comprise a tubular body 19 whose ends are closed by the plate members 20, 21 respectively; said tie rod being through said end plates and the assembly maintained by nuts and lock nuts 22, 23. The casing, of course, is water tight. The filter unit 15 is spaced from the end or side plates, thus forming the chambers 24 and 25 within the casing; nuts 26 on the tie rod holding said filter unit in its required position. Plate 20 presents a port 27 to chamber 24 and plate 21 presents a port 28 to the chamber 25.

The filter unit 15 comprises a plurality of tubular porous filter members 29, 30, 31, 32 which may be of any suitable structure though here shown as being of wire mesh and a plurality of tubular imperforate baffle members 33, 34, 35 and 36. All these tubular members are of different diameter, are positioned spaced one within another; there being a baffle between successive filter members with baffle 36 outermost and spaced from the casing wall 19. In the embodiment illustrated, the casing 18 is cylindrical and all tubular members comprising the filter unit and casing, are in concentric relation, with the tie rod 17 as axis. The outer baffle 36 has an outer ring 37 thereon in water-tight contact with an inner ring 39 on the casing's tubular wall 19. Suitable gaskets, not shown except at 38, are provided to accomplish water-tight construction. It is to be noted that fluid to be filtered, entered at any one of the ports, can reach the other port only by passage through the filter members.

One end of the innermost tubular filter member 29 is closed by a plate 40, while its other end and the corresponding end of the tubular baffle member 33 are joined everywhere together so that fluid entering the open end of the tubular filter member 29 and passing through such filter member, shall pass out of the other end of said baffle member 33. In like manner, each end of every filter member of unit 15, is joined to an end of a baffle member so that one end of one baffle member and the opposite end of the next baffle member are joined to the respective ends of the filter member between such pair of baffle members. The outer baffle member 36 will have only one of its ends joined to the filter member 32. Since it is best that all tubular members constituting the filter unit 15 be cylindrical, the baffle members, have suitable flanges as 41, 42, which may be integral therewith respectively or separate members suitably secured to such baffle members. It is evident that fluid entering one of the ports 27, 28 can leave by the other, only after such fluid has passed through a filter member, because the partition formed by the contacting rings 37, 39, will not oherwise permit flow between the chambers 24 and 25.

The spider members 16 are each provided with a hole 43 for the tie rod 17 and suitable spaced channels 44 across corresponding faces of its arms 45' to mount the filter unit 15. The stop lugs 45 are faced with rubber tabs 46 for the ends of the spider arms to press into upon tightening of the nuts 26, so that the filter unit 15 is held stationary.

Although the filter may operate in any position, the preferred embodiment is as illustrated, where all tubular members of the filter unit 15, are positioned horizontally. An auxiliary strainer means denoted generally by the numeral 47 has its own casing 48 which may be attached to and used as part of its wall, the casing 18. Said casing 48 is preferably provided with a hand hole covered securely by a releasable cover 49 to have access to a horizontal filter member 50 partitioning the casing 48 above a conical vortex filter member 51; the latter being seated in the lower part of the casing 48; part 52 being arranged to be easily detachable. The said casing 48 is provided with the ports 53, 54 above the filter member 50 and a port 55 below the filter member 51.

The apparatus of Fig. 1 is employed in a system shown in Fig. 5, where numeral 56 indicates the supply fluid to be filtered and numeral 57 denotes the receiver for the filtered fluid. The piping, pumps and control valves shown, are as follows. The two-way valve 58 is to direct the flow of supply fluid forced into pipe 59 by the pump 60, into either of the pipes 61, 61'. The two-way valve 62 is for making port 27 communicative with either pipe 61 or the port 53. The two-way valve 62' is for making port 28 communicative with either the pipe 61' or the port 54. The pipe 61 has a branch pipe 63 with a valve 64 interposed therein, connected to pipe 65 which discharges into the receiver 57. Pipe 61' has a branch pipe 63' with a valve 64' interposed therein, connected to said pipe 65. A pipe 66 leading from the port 55, has a suction pump 67 interposed therein and discharges into the receiver 57.

To set the apparatus of Fig. 5 for operation, valve 64 is closed, valve 64' is opened, valve 58 is set to make pipes 59 and 61 communicative, valve 62 is set to make port 27 communicative with pipe 61 and the valve 62' is set to make port 28 communicative with pipe 61'. The fluid to be filtered, flowing through pipe 59, will enter chamber 24, pass into the interior of the tubular filter members of filter unit 15, pass through such filter members' walls whereupon sediment in such fluid being treated will be retained and collect on the inside surfaces of said filter members 29, 30, 31, 32, and the filtered fluid will pass into the chamber 25, whence it will be discharged through port 28 into pipe 61' and will pass through branch 63' and be discharged from pipe 65 into the receiver 57.

When the sediment deposits on the inner surfaces of the filter members of unit 15 become appreciable, and same would be indicated by an increase of pressure in the chamber 24, or viewed by the slowing up of the flow from the pipe 65, valve 58 is closed, valve 64 is opened, valve 64' is closed and the valve 62 is set to make port 27 communicative with port 53, and finally valve 58 is set to make pipe 59 communicative with pipe 61'. The fluid to be filtered flowing through pipe 59, will enter chamber 25, pass into the interior of the baffle members 33, 34, 35, 36, pass through the walls of the filter members 29, 30, 31, 32 into the interiors of said filter members, thus washing away and clearing said filter members of deposited sediment thereon, thence pass into the chamber 24, out through the port 27, into the casing 48. The sediment will be retained by the filter members 50, 51 and clear filtrate will leave the casing 48 through port 55 and be discharged into the receiver 57. The suction action of pump 67 will cause the sediment which is collected in the auxiliary filter means 47, to become practically dry.

Filter operation continues through the unit 15 and after the passage of sufficient time as judged by experience that the sediment first deposited on the filter members of the unit 15 has been washed away or as may be determined by a fall in pressure in chamber 25, valve 62 is set to make port 27 communicative with the pipe 61, whereupon the filter means 47 is disconnected and all filtering is continued only through the unit 15.

It is evident that the valves may be arranged to connect or disconnect the filter means 47 from the circuit of flow, and that the flow be entirely through the unit 15. Direction of flow through the unit 15 and whether the filter means 47 is in or out of circuit, will determine which side of the filter members of unit 15 are being cleared of deposited sediment, or whether filtration is effected only by unit 15 respectively. It is evident that the filter members of unit 15 become automatically cleaned without interruption of operation, other than the slight intervals necessary to set the valves to put filter means 47 into or out of circuit and the other valve settings required as mentioned. When filter means 47 is out of circuit, without interruption of operation through the filter unit 15, said auxiliary unit 47 may be cleaned. The numerals 70, 71 indicate ports opening respectively into the chambers 24, 25, for the connection to gages not shown, which indicate pressure.

If the nature of the filtrate is such that it requires to be further treated in some manner before entering the receiver, or if further treatment is prescribed by a particular process applied, the filtrate may be directed to any collateral apparatus by having the branch 72 in pipe 65 and the accompanying valves 73, 74.

When the nature of the fluid to be filtered permits it, force pump 60 may be omitted, and such fluid shall come from a source from where it can enter the system by gravity and fall through the filters.

In any event, the materials of which the various components of the system are made, should be of a nature inert to any action thereon by any matter passing therethrough.

This invention is capable of numerous forms and various applications without departing from the essential features herein disclosed. It is therefore intended and desired that the embodiment shown herein be deemed illustrative and not restrictive and that the patent shall cover all patentable novelty herein set forth; reference being had to the following claims rather than to the specific description herein to indicate the scope of this invention.

I claim:

1. In an apparatus of the character described, a casing, a plurality of tubular filter members, a plurality of imperforate tubular baffle members; one of the baffle members being outside all the other tubular members and all said tubular members being one within another in alternate relation; all of said tubular members lying in substantially one direction within the casing; said outermost baffle member and the ends of all the tubular members being spaced from the inner walls of said casing, a partition extending laterally from the outer surface of the outermost baffle member and around the periphery of said latter member to the inner surface of the casing and joined thereto respectively in water-tight relation whereby fluid entering the casing to one side of said partition is compelled to pass through said tubular members before it could reach the other side of said partition; one end of said outermost baffle member being joined circumferentially to the corresponding end of the filter member immediately adjacent; the ends of the remaining baffle members being circumferentially joined to the corresponding ends of the filter members adjacent thereto so that one end of each tubular member within the outermost baffle member is joined to only one end of an adjacent tubular member; adjacent tubular members being in spaced relation except where so joined; said casing having a port for the flow of fluid to one side of said partition and another port for the flow of fluid at the other side of said partition.

2. The apparatus as defined in claim 1, wherein the partition comprises a ring extending as an outer flange on the outermost baffle member and a ring extending as an inner flange on the casing; said rings being engaged in water-tight relation.

3. The apparatus as defined in claim 1, wherein all the tubular members are concentric and all the baffle members are provided with rings at their ends extending to the filter members; each ring being circumferentially joined to an end of a filter member respectively.

4. The apparatus as defined in claim 1, including a pipe leading to a supply of fluid to be filtered, a pipe leading to a receiver of filtered liquid and valve means for selectively connecting the ports of the casing to said pipes, whereby when one of said ports is made communicative with one of said pipes the other can be made communicative with the other of said pipes.

5. The apparatus as defined in claim 1, wherein the casing comprises a tubular member and separate end members and including a tie rod and bracket members supporting the assembly of tubular members within the casing; said bracket members being carried on said tie rod; said tie rod being positioned through the innermost tubular member within the casing, through said supporting brackets and through said end plates and nut means threadedly engaging said tie rod and releasably securing said bracket members to the tubular members within the casing and releasably securing said end members to close the ends of the tubular casing member.

6. The apparatus as defined in claim 1, including an auxiliary filter means having a second casing with an intake port and a discharge port, a pipe leading to a supply of fluid to be filtered, a pipe leading to a receiver of filtered fluid, valve means for selectively connecting the ports of the first casing to said pipes whereby when one of said ports of the first casing is made communicative with one of said pipes the other can be made communicative with the other of said pipes, valve means for selectively connecting the ports of said first casing to the intake port of the second casing means and a pipe connecting the discharge port of said second casing means to said receiver.

7. The apparatus as defined in claim 6, including a suction pump interposed in the pipe connecting the discharge port of the second casing means to said receiver.

8. The apparatus as defined in claim 7, including a force pump interposed in the pipe leading from the source of fluid to be filtered.

9. The apparatus as defined in claim 1, including an auxiliary filter means having a second casing with an intake port and a discharge port, a pipe leading from said discharge port to the receiver, a pipe leading from a supply of fluid to be filtered, a first pipe, a second pipe, valve means for communicatively connecting said supply pipe selectively to said first pipe and second pipe respectively, valve means for communicatively connecting one port of the first casing selectively to said first pipe and the intake port of the second casing respectively, valve means for communicatively connecting the other port of the first casing selectively to said second pipe and the intake port of the second casing means, a pipe leading to a receiver of filtered fluid, a branch communicatively connecting the first pipe and another branch communicatively connecting the second pipe to the pipe leading to the receiver and valves interposed one in each of said branches.

10. The apparatus as defined in claim 9, including a suction pump interposed in the pipe leading from the discharge port of the second casing means to the receiver.

11. The apparatus as defined in claim 10, including a force pump interposed in the pipe leading from the source of fluid to be filtered.

References Cited in the file of this patent

UNITED STATES PATENTS

| | | |
|---|---|---|
| 103,280 | Barrows | May 24, 1870 |
| 264,011 | Wheeler | Sept. 5, 1882 |
| 2,221,210 | Soderquist | Nov. 12, 1940 |
| 2,278,453 | Kracklauer | Apr. 7, 1942 |
| 2,572,131 | Galloway | Oct. 23, 1951 |

FOREIGN PATENTS

| | | |
|---|---|---|
| 287,932 | Great Britain | Jan. 31, 1929 |